United States Patent
Li

(10) Patent No.: US 12,429,563 B2
(45) Date of Patent: Sep. 30, 2025

(54) MOTOR CONTROL METHOD, LASER RADAR, AND MOBILE DEVICE

(71) Applicant: SZ DJI TECHNOLOGY CO., LTD., Shenzhen (CN)

(72) Inventor: Tao Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1121 days.

(21) Appl. No.: 17/368,344

(22) Filed: Jul. 6, 2021

(65) Prior Publication Data

US 2021/0333368 A1 Oct. 28, 2021

Related U.S. Application Data

(63) Continuation of application No. PCT/CN2019/071027, filed on Jan. 9, 2019.

(51) Int. Cl.
| | |
|---|---|
| *H02P 5/56* | (2016.01) |
| *G01S 7/481* | (2006.01) |
| *G01S 7/497* | (2006.01) |
| *G01S 17/89* | (2020.01) |
| *H02P 5/00* | (2016.01) |
| *H02P 8/38* | (2006.01) |

(52) U.S. Cl.
CPC ............ *G01S 7/4817* (2013.01); *G01S 7/497* (2013.01); *G01S 17/89* (2013.01); *H02P 5/00* (2013.01)

(58) Field of Classification Search
CPC .......... H02P 27/06; H02P 27/12; H02P 29/02; H02P 29/0241; H02P 29/68; H02P 3/00; H02P 3/04; H02P 3/18; H02P 6/006; H02P 6/007; H02P 6/10; H02P 6/14; H02P 6/15; H02P 6/30; H02P 7/00; H02P 7/0094; H02P 9/007; H02P 1/46
See application file for complete search history.

(56) References Cited

U.S. PATENT DOCUMENTS

| | | | |
|---|---|---|---|
| 5,019,760 A | 5/1991 | Chu et al. | |
| 5,239,247 A * | 8/1993 | Habig | ........................ H02P 5/50 318/67 |
| 2005/0238335 A1* | 10/2005 | Miyazaki | .............. H02P 29/045 318/434 |

(Continued)

FOREIGN PATENT DOCUMENTS

| | | |
|---|---|---|
| CN | 101339427 A | 1/2009 |
| CN | 102381481 A | 3/2012 |

(Continued)

OTHER PUBLICATIONS

The World Intellectual Property Organization (WIPO) International Search Report for PCT/CN2019/071027 Sep. 27, 2019 6 pages (translation included).

*Primary Examiner* — Muhammad S Islam
*Assistant Examiner* — Charles S Laughlin
(74) *Attorney, Agent, or Firm* — ANOVA LAW GROUP, PLLC

(57) ABSTRACT

Embodiments of the present disclosure provide a motor control method, a laser radar, and a movable device. The method includes: determining start times of multiple motors, the start times of the multiple motors being partially or completely different; and controlling each motor of the multiple motors to start at a corresponding start time of the motor.

20 Claims, 9 Drawing Sheets

(56) References Cited

U.S. PATENT DOCUMENTS

| | | | |
|---|---|---|---|
| 2009/0195200 A1 | 8/2009 | Nagata et al. | |
| 2010/0028165 A1 | 2/2010 | Kameya et al. | |
| 2013/0264977 A1 | 10/2013 | Bonner et al. | |
| 2014/0191513 A1 | 7/2014 | Kees et al. | |
| 2019/0369252 A1* | 12/2019 | Girotti | G01S 17/42 |

FOREIGN PATENT DOCUMENTS

| | | |
|---|---|---|
| CN | 103941750 A | 7/2014 |
| CN | 104812671 A | 7/2015 |
| CN | 105846726 A | 8/2016 |
| CN | 105971864 B | 9/2017 |
| CN | 208255418 U | 12/2018 |
| JP | S58172983 A | 10/1983 |
| JP | S60168092 A | 8/1985 |
| JP | 10104341 A | 4/1998 |
| JP | 2004343892 A | 12/2004 |
| JP | 2009251504 A | 10/2009 |

* cited by examiner

MOTOR CONTROL METHOD, LASER RADAR, AND MOBILE DEVICE

CROSS-REFERENCE TO RELATED APPLICATION

This application is a continuation of International Application No. PCT/CN2019/071027, filed Jan. 9, 2019, the entire content of which is incorporated herein by reference.

TECHNICAL FIELD

The present disclosure relates to the technical field of laser radar and, more particularly, to a motor control method, a laser radar, and a movable device.

BACKGROUND

Laser radar is a device that drives laser original to rotate through rotation of a motor, and obtains distance and angle information of an object relative to the laser radar through reflection and refraction of light on the object in a three-dimensional space. The laser radar usually includes multiple motors, which work together to obtain accurate information in the three-dimensional space. Therefore, operation status of the motor will directly determine final imaging effect of the entire laser radar.

When the laser radar is started, the multiple motors are started at the same time, and each motor will generate a large inrush current when starting, which makes total starting current of the laser radar abnormally large, so that the laser radar is abnormal.

SUMMARY

The embodiments of the present disclosure provide a motor control method, a laser radar, and a movable device, which are configured to solve the problems of abnormally occurred large starting current when the existing laser radar is started.

In one aspect, the embodiments of the present disclosure provide a motor control method applied to a laser radar including multiple motors. The method includes: determining start times of the multiple motors, the start times of the multiple motors being partially or completely different; and controlling each motor of the multiple motors to start at a corresponding start time of the motor.

In another aspect, the embodiments of the present disclosure provide a laser radar control method applied to a system including multiple laser radars. The method includes: determining start times of the corresponding laser radars, and ensuring that the start times of the multiple laser radars are partially or completely different; and controlling each laser radar of the multiple laser radars to start at a corresponding start time of the laser radar.

In another aspect, the embodiments of the present disclosure provide a laser radar including a processor and multiple motors. The processor is configured to: determine start times of the multiple motors, the start times of the multiple motors being partially or completely different; and control each motor of the multiple motors to start at a corresponding start time of the motor.

In another aspect, the embodiments of the present disclosure provide a laser radar system including multiple laser radars, and each laser radar includes a processor. The processor is configured to: determine start times of the corresponding laser radars, and ensure that the start times of the multiple laser radars are partially or completely different; and control each laser radar of the multiple laser radars to start at a corresponding start time of the laser radar.

In another aspect, the embodiments of the present disclosure provide a movable device including a vehicle body and a laser radar mounted at the vehicle body. The laser radar includes a processor and multiple motors. The processor is configured to: determine start times of the multiple motors, the start times of the multiple motors being partially or completely different; and control each motor of the multiple motors to start at a corresponding start time of the motor.

In another aspect, the embodiments of the present disclosure provide a movable device including a vehicle body and a laser radar system mounted at the vehicle body. The laser radar system includes multiple laser radars, and each laser radar includes a processor. The processor is configured to: determine start times of the corresponding laser radars, and ensure that the start times of the multiple laser radars are partially or completely different; and control each laser radar of the multiple laser radars to start at a corresponding start time of the laser radar.

According to the motor control method, the laser radar, and the movable device provided by the embodiments of the present disclosure, the start times of the multiple motors that are partially or completely different are determined, and the various motors are controlled to start at the corresponding start times, so that the number of motors that are started at the same time when the laser radar is started is reduced, and the total starting current is reduced, which thereby avoids abnormality of the laser radar due to excessive starting current, and improves the stability of the laser radar.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are some embodiments of the present disclosure, and other drawings can be obtained from these drawings without any inventive effort for those of ordinary skill in the art.

DETAILED DESCRIPTION OF THE EMBODIMENTS

Figure 1:
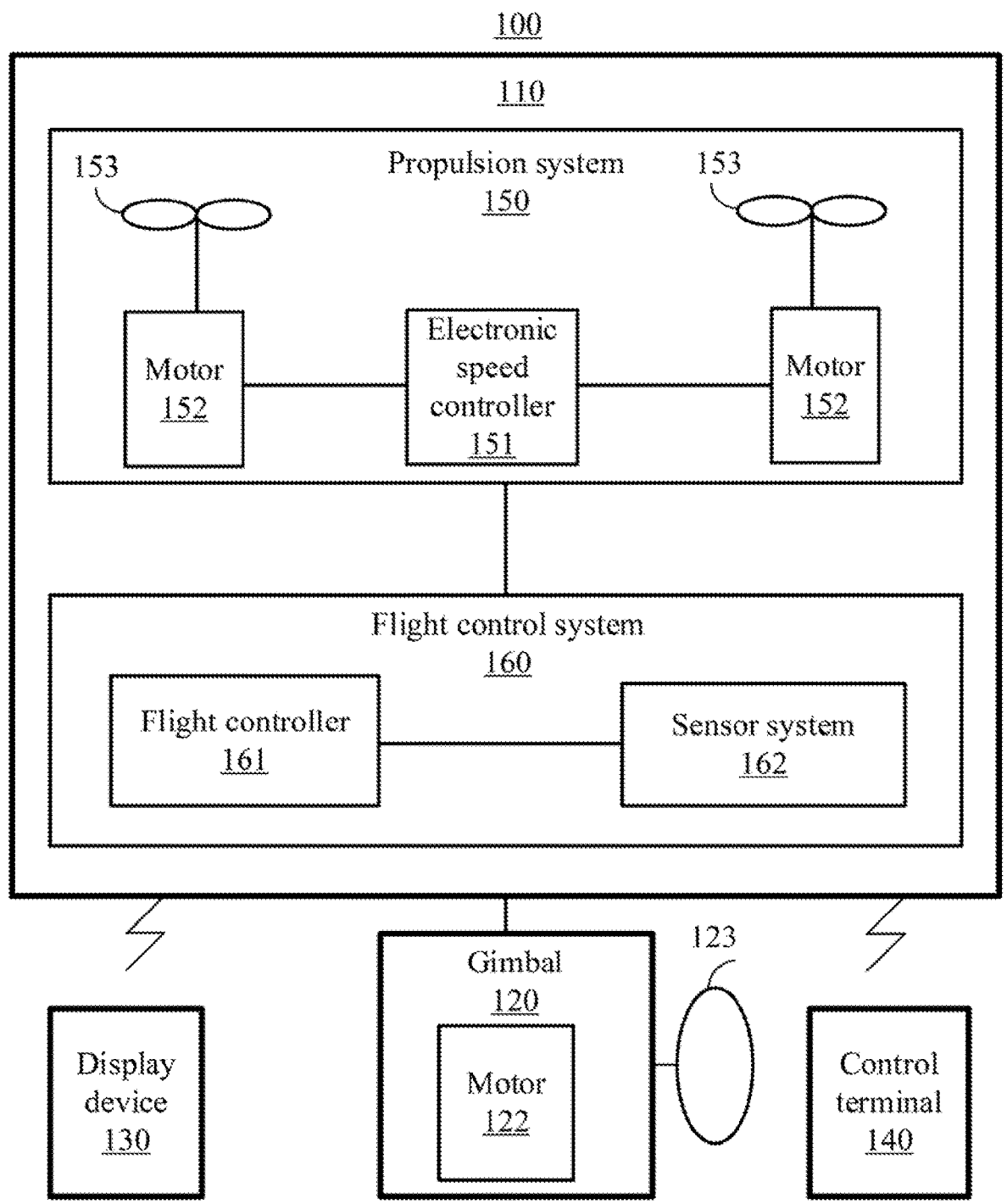
FIG. 1 is a schematic architecture diagram of an unmanned aerial system according to the present disclosure.

In order to make the objectives, technical solutions, and advantages of the embodiments of the present disclosure clearer, the technical solutions in the embodiments of the present disclosure will be clearly and completely described in combination with the accompanying drawings. Obviously, the described embodiments are some of rather than all the embodiments of the present disclosure. All other embodiments obtained by those of ordinary skill in the art based on the embodiments of the present disclosure without inventive effort shall fall within the scope of the present disclosure.

It should be noted that when a component is referred to as being "fixed to" another component, it can be directly attached to the other component(s) or an intervening component may also exist. When a component is considered to be "connected" to another component, it can be directly connected to the other component(s) or an intervening component may exist at the same time.

Unless otherwise defined, all technical and scientific terms used herein have the same meaning as commonly understood by those skilled in the technical field of the present disclosure. The terms used in the description of the present disclosure herein are for the purpose of describing specific embodiments only and are not intended to limit the present disclosure. The term "and/or" as used herein includes any and all combinations of one or more listed items associated.

Hereinafter, some embodiments of the present disclosure will be described in detail with reference to the accompanying drawings. In the case of no conflict, the following embodiments and features in the embodiments can be combined with each other.

The present disclosure provides a motor control method, a laser radar, and a movable device. The laser radar of the embodiments of the present disclosure can be applied to the movable device, and the laser radar can be mounted at a device body of the movable device. The movable device with the laser radar can measure external environment, for example, measuring distance between the movable device and an obstacle for obstacle avoidance and other purposes, and performing two-dimensional or three-dimensional mapping of the external environment. The movable device includes at least one of an unmanned aerial vehicle, a car, a remote control vehicle, a robot, or a camera. When the laser radar is applied to an unmanned aerial vehicle, the movable device is a vehicle body of the unmanned aerial vehicle. When the laser radar is applied to a car, the movable device is a body of the car. The car can be a self-driving car or a semi-self-driving car, which is not limited herein. When the laser radar is applied to a remote control vehicle, the movable device is a body of the remote control vehicle. When the laser radar is applied to a robot, the movable device is the robot. When the laser radar is applied to a camera, the movable device is the camera itself.

The unmanned aerial vehicle may be, for example, a rotorcraft, such as a multi-rotor aircraft propelled by a plurality of propulsion devices through air, and the embodiments of the present disclosure are not limited thereto.

FIG. 1 is a schematic architecture diagram of an unmanned aerial system 100 according to the present disclosure. A rotor unmanned aerial vehicle is taken as an example for description of the present disclosure.

The unmanned aerial system 100 includes an unmanned aerial vehicle 110, a display device 130, and a control terminal 140. The unmanned aerial vehicle 110 includes a propulsion system 150, a flight control system 160, a frame, and a gimbal 120 carried at the frame. The unmanned aerial vehicle 110 can wirelessly communicate with the control terminal 140 and the display device 130.

The frame may include a vehicle body and a stand (also called a landing gear). The vehicle body may include a center frame and one or more arms connected to the center frame, and the one or more arms extend radially from the center frame. The stand is connected to the vehicle body, and is configured to support the unmanned aerial vehicle 110 when it is landed.

The propulsion system 150 includes one or more electronic speed controllers (referred to as ESC for short) 151, one or more propellers 153, and one or more motors 152 corresponding to the one or more propellers 153. The motor 152 is connected between the electronic speed controller 151 and the propeller 153, and the motor 152 and the propeller 153 are arranged at the arm of the unmanned aerial vehicle 110. The electronic speed controller 151 is configured to receive driving signals generated by the flight control system 160 and provide driving current to the motor 152 according to the driving signals to control the rotation speed of the motor 152. The motor 152 is configured to drive the propeller to rotate, so as to provide power for the flight of the unmanned aerial vehicle 110, and the power enables the unmanned aerial vehicle 110 to achieve one or more degrees of freedom of motion. In some embodiments, the unmanned aerial vehicle 110 may rotate about one or more rotation axes. For example, the rotation axis described above may include a roll axis (Roll), a yaw axis (Yaw), and a pitch axis (Pitch). It should be understood that the motor 152 may be a DC motor or an AC motor. Also, the motor 152 may be a brushless motor or a brush motor.

The flight control system 160 includes a flight controller 161 and a sensor system 162. The sensor system 162 is configured to measure attitude information of the unmanned aerial vehicle, i.e., position information and status information of the unmanned aerial vehicle 110 in space, such as three-dimensional position, three-dimensional angle, three-dimensional velocity, three-dimensional acceleration, and three-dimensional angular velocity, etc. The sensor system 162 may include, for example, at least one of sensors such as a gyroscope, an ultrasonic sensor, an electronic compass, an inertial measurement unit (IMU), a vision sensor, a global navigation satellite system, or a barometer. For example, the global navigation satellite system may be a Global Positioning System (GPS). The flight controller 161 is configured to control the flight of the unmanned aerial vehicle 110, for example, to control the flight of the unmanned aerial vehicle 110 according to the attitude information measured by the sensor system 162. It should be understood that the flight controller 161 can control the unmanned aerial vehicle 110 according to pre-programmed program instructions, and can also control the unmanned aerial vehicle 110 by responding to one or more control instructions from the control terminal 140.

The gimbal 120 includes a motor 122. The flight controller 161 can control the movement of the gimbal 120 through the motor 122. As another embodiment, the gimbal 120 may further include a controller for controlling the movement of the gimbal 120 by controlling the motor 122. It should be understood that the gimbal 120 may be independent of the unmanned aerial vehicle 110 or a part of the unmanned aerial vehicle 110. It should be understood that the motor 122 may be a DC motor or an AC motor. Also, the motor 122 may be a brushless motor or a brush motor. It should also be understood that the gimbal can be located at the top of the unmanned aerial vehicle, or at the bottom of the unmanned aerial vehicle.

In some embodiment, the gimbal 120 may be configured to carry a laser radar or laser radar system 123. The laser radar or laser radar system 123 may also communicate with the flight controller 161 and work under the control of the flight controller 161 to obtain point cloud data in a three-dimensional space. It can be understood that the laser radar or laser radar system 123 can also be directly fixed at the unmanned aerial vehicle 110 so that the gimbal 120 can be omitted.

The display device 130 is located at the ground end of the unmanned aerial system 100, which can communicate with the unmanned aerial vehicle 110 in a wireless manner, and is configured to display the attitude information of the unmanned aerial vehicle 110. It should be understood that the display device 130 may be an independent device or integrated in the control terminal 140.

The control terminal 140 is located at the ground end of the unmanned aerial system 100, which can communicate with the unmanned aerial vehicle 110 in a wireless manner for remote control of the unmanned aerial vehicle 110.

In addition, the unmanned aerial vehicle 110 may also be equipped with a speaker (not shown in the figure), which is configured to play audio files. The speaker may be directly fixed at the unmanned aerial vehicle 110, and may also be mounted at the gimbal 120.

Motor control methods provided in the following embodiments can be applied to the laser radar or laser radar system 123. It should be understood that the naming for each component of the unmanned aerial system described above is only for identification purpose, and is not to be construed as a limitation to the embodiments of the present disclosure.

Figure 2:
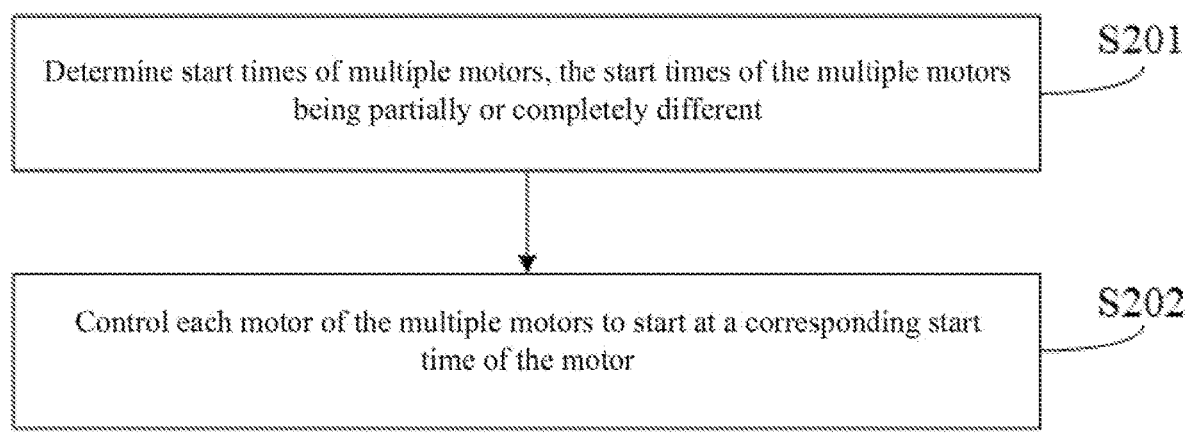
FIG. 2 is a flow chart of a motor control method according to an embodiment of the present disclosure.

FIG. 2 is a flow chart of a motor control method according to an embodiment of the present disclosure. The method consistent with the present disclosure may be applied to a laser radar, and the laser radar may include multiple motors. As shown in FIG. 2, the method consistent with the present disclosure includes two processes.

S201, determining start times of multiple motors, the start times of the multiple motors being partially or completely different.

In some embodiments, for example, the start time of the multiple motors can be determined according to start time of the laser radar and a preset motor start interval time. For example, the preset motor start interval time can be determined according to average time required for the motor to start. For example, if the start time of the laser radar is t, and the preset motor start time interval is $\Delta t$, then start time of first motor can be t, start time of second motor can be $t+\Delta t$, start time of third motor can be $t+2*\Delta t$, . . . , and start time of nth motor can be $t+(n-1)*\Delta t$, where n is number of motors included in the laser radar.

In some embodiments, for example, the multiple motors can be sorted, and time when last motor is started is used as start time of current motor, that is, the multiple motors are started in sequence. The time when the motor is started is the time when rotation speed of the motor reaches target rotation speed of the motor, and duration of current in the motor being less than preset current threshold reaches preset duration. For example, the multiple motors can be sorted according to the target rotation speed of the motors.

For example, in order to reduce total starting current when the laser radar is started, at least two motors have different start times.

It can be understood that value and duration of inrush current generated when a motor with high target rotation speed is started are greater than those of a motor with low target rotation speed. For example, in order to further improve stability of the laser radar, it can be determined that the motor with high target rotation speed is started before the motor with low target rotation speed, that is, the motor with high target rotation speed is started first.

For example, the start times of the multiple motors can be determined according to identification information of the multiple motors, where the identification information is configured to uniquely identify the motor. For example, time interval between the start time of the motor and the start time of the laser radar can be determined according to the identification information of the motor, and thereby the start time of the motor can be determined.

S202, controlling each motor of the multiple motors to start at a corresponding start time of the motor.

In some embodiments, after the start times of the various motors are determined, the various motors are controlled to start at the corresponding start times according to the start times of the various motors. The present disclosure does not limit the specific implementation manner to start the motor.

Below is the description of the beneficial effects of the present disclosure with specific examples. In an example where the laser radar includes three motors M1, M2, and M3, if the maximum values of the inrush current generated when M1, M2, and M3 are started are A1, A2, and A3, respectively, and $A1 \geq A2 \geq A3$, then in existing technology, when the laser radar is started, total starting current value will be as high as A1+A2+A3, and the laser radar is prone to abnormalities due to excessive total starting current. When the method consistent with the present disclosure is used, if the start times of the multiple motors are all different, the starting current value will not exceed A1 when the laser radar is started; if the start times of the multiple motors are partially different, the starting current value will not exceed A1+A2 when the laser radar is started. Therefore, the total starting current when the laser radar is started is effectively reduced.

In the motor control method consistent with the present disclosure, the start times of the multiple motors that are partially or completely different are determined, and the various motors are controlled to start at the corresponding start times, so that the number of motors that are started at the same time when the laser radar is started is reduced, and the total starting current is reduced, which thereby avoids abnormality of the laser radar due to excessive starting current, and improves the stability of the laser radar.

On the basis of the embodiments described above, implementation manners of S202 in the embodiments described above will be described in detail below, that is, startup process of a single motor will be described in detail. In the existing technology, a target rotation speed is usually given to the motor directly, so that the motor can directly rotate to the specified target rotation speed at a time. The target rotation speed of the motor is the speed value that the motor needs to reach when the motor is working normally. Due to motor's own state and/or environmental factors, during the motor startup process, the motor current may be abnormally large and last too long, which may cause the motor to burn out and cause the laser radar to not work normally. For example, with aging of the motor, such as aging of motor bearing, resistance of the motor to start increases, or temperature of external environment is too low, which causes grease in the bearing to solidify, which leads to resistance increase of the motor to start, which will all cause the starting current of the motor to be abnormally high.

On the basis of the embodiments described above, in order to reduce the starting current of the motor, increase probability of successful starting of the motor, and improve the stability of the laser radar, the method consistent with the present disclosure controls each motor of the multiple motors to start at a corresponding start time of the motor. One of the implementation manners may be: obtaining the target rotation speed of the motor; determining graded rotation speed according to the target rotation speed, the graded rotation speed being less than the target rotation speed; controlling the motor to start at the graded rotation speed at the start time of the motor.

In some embodiments, the target rotation speed of the motor may be fixed, or may be continuously changed depending on working requirements of the laser radar, which is not limited in the present disclosure. In some embodiments, after the target rotation speed of the motor is obtained, a graded rotation speed less than the target rotation speed is determined according to the target rotation speed, and the motor is controlled to start at the graded speed at the start time of the motor. It should be noted that when the motor's own state and external environmental factors are determined, the starting current of the motor is positively correlated with the rotation speed.

For example, if the obtained rotation target speed of the motor is 5000 rpm, a current of 8 amperes may be generated if the motor is started directly at the target rotation speed, which is much larger than current value of 0.8 amperes during normal operation of the motor. Also, high current will last a long time, such as 4 seconds, so it is very easy to damage the motor. Using the method consistent with the present disclosure, for example, the graded rotation speed can be determined to be 2000 rpm according to the target rotation speed of 5000 rpm, and then the motor is started at the graded rotation speed of 2000 rpm. At this time, only 4 amperes of current may be generated, and only lasts 2 seconds. It should be noted that the numerical values in the present disclosure are merely illustrative.

Based on the embodiments described above, in the motor control method consistent with the present disclosure, the target rotation speed of the motor is obtained, the graded rotation speed less than the target rotation speed is determined according to the rotation target speed, and the motor is controlled to start at the graded speed at the start time of the motor, so that not only the starting current value of motor can be reduced, but also duration of high current can be shortened, which not only can prevent the motor from burning due to excessive starting current, but also can increase the probability of successful motor startup, thereby improving the stability of the laser radar.

In some embodiments, an implementation manner for determining the graded rotation speed according to the target rotation speed may be: determining the graded rotation speed according to the target rotation speed and corresponding relationship between the rotation speed and the current; or, determining the graded rotation speed according to the target rotation speed and ambient temperature; or, determining the graded rotation speed according to the target rotation speed, the ambient temperature, and the corresponding relationship between the rotation speed and the current.

For example, when the ambient temperature decreases, grease viscosity in the motor will increase, and resistance of the motor to start will increase. Therefore, when the ambient temperature decreases, the graded rotation speed can be reduced; when the ambient temperature rises, the graded rotation speed can be appropriately increased.

For example, after the motor is started at the graded speed, the method consistent with the present disclosure may further include, if the rotation speed of the motor reaches the graded rotation speed and the current in the motor is less than the preset current threshold, increasing the rotation speed of the motor until the rotation speed of the motor reaches the target rotation speed.

After the starting current and the duration of the large current of the motor are reduced by starting the motor at the graded rotation speed lower than the target rotation speed, in order to make the motor enter normal working state as soon as possible, when the rotation speed of the motor reaches the graded rotation speed, and the current in the motor is less than the preset current threshold, the rotation speed of the motor can be gradually increased until the rotation speed of the motor reaches the target rotation speed, so that the motor enters the normal working state. The rotation speed of the motor can be determined by detecting speed of code disc.

In an example where the target rotation speed is 5000 rpm, the target rotation speed can be evenly divided into several rotation speed levels, such as 1000 rpm, 2000 rpm, 3000 rpm, 4000 rpm, and 5000 rpm. The motor can be started at a graded rotation speed of 1000 rpm first, and when the rotation speed reaches 1000 rpm and the current in the motor is less than the preset current threshold, the rotation speed can be increased to 2000 rpm, and so on. The rotation speed is gradually increased to 5000 rpm, so that the motor enters the normal working state. The target rotation speed can also be divided into several stepped rotation speed levels, such as 1000 rpm, 2000 rpm, and 5000 rpm.

For example, in order to avoid misjudgment when the current is less than the preset current threshold due to current fluctuations, in some embodiments, when the current in the motor is less than the preset current threshold and lasts for a preset duration, the rotation speed of the motor is increased. For example, the rotation speed of the motor is increased when the current in the motor is less than 1 ampere and lasts for 1 second, which avoids misjudgment due to current fluctuations, and improves stability of the motor startup.

For example, in order to increase starting speed of the motor, the preset current threshold in some embodiments is greater than or equal to the current for a stabilized operation of the motor. For example, if the current value when the motor is operating smoothly is 0.8 ampere, the preset current threshold can be set to 1 ampere. That is, the rotation speed of the motor can be increased without the current falling back to the current when the motor is operating smoothly, which can ensure that the target rotation speed is reached faster, i.e., the starting speed of the motor is increased.

Figure 3:
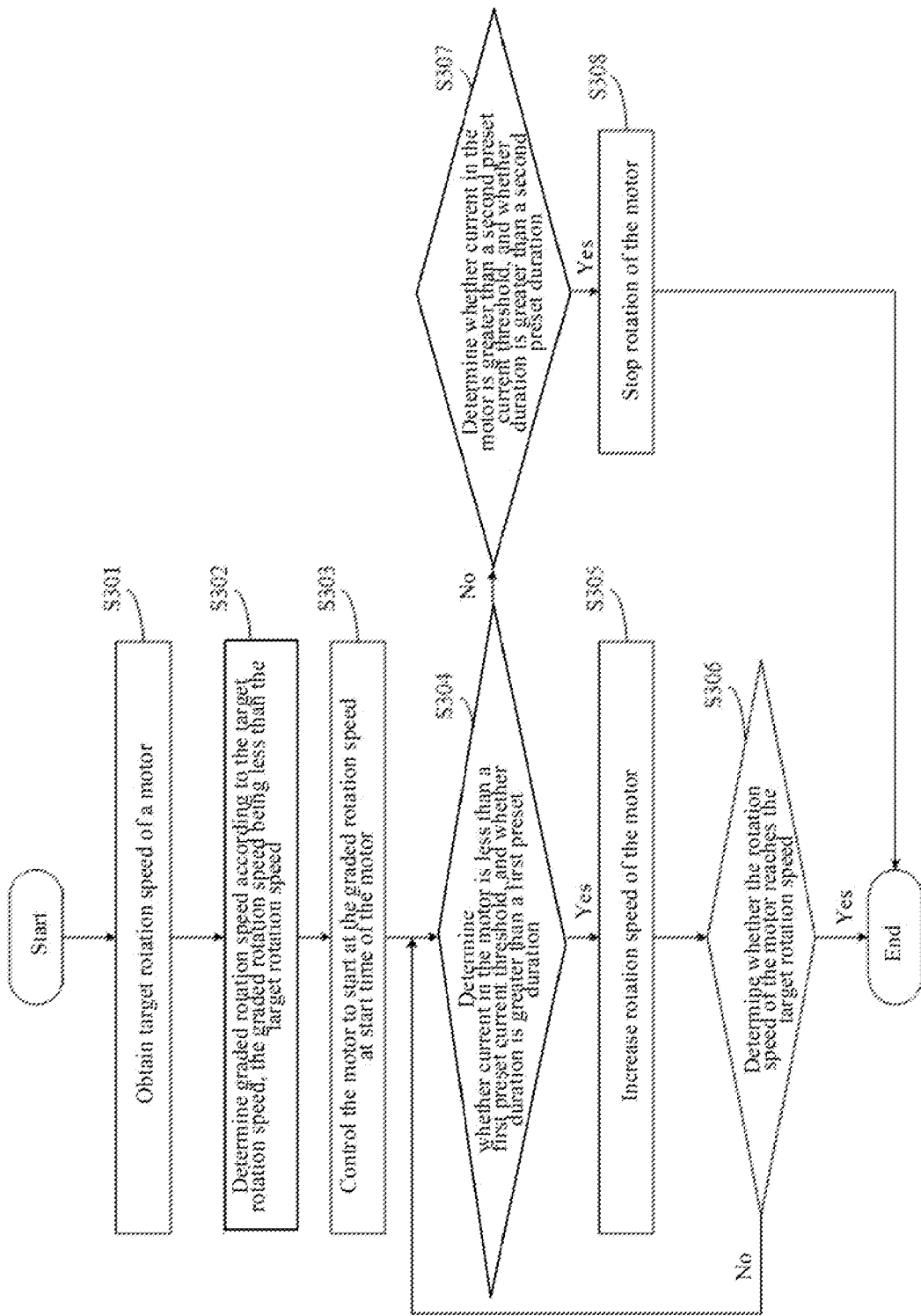
FIG. 3 is a flow chart of a motor control method according to another embodiment of the present disclosure.

FIG. 3 is a flow chart of the motor control method according to another embodiment of the present disclosure. As shown in FIG. 3, based on the embodiments shown in FIG. 2, the method consistent with the present disclosure includes the following processes.

S301, obtaining the target rotation speed of the motor.

S302, determining the graded rotation speed according to the target rotation speed, the graded rotation speed being less than the target rotation speed.

S303, controlling the motor to start at the graded rotation speed at the start time of the motor.

S304, determining whether the current in the motor is less than a first preset current threshold, and whether the duration is greater than a first preset duration. If yes, S305 is executed; if not, S307 is executed.

The first preset current threshold is greater than or equal to the current for a stabilized operation of the motor.

S305, increasing the rotation speed of the motor.

In some embodiments, for example, speed classification strategy may be determined according to a predetermined speed classification strategy, or according to operation status of the motor and environmental factors, and the rotation speed of the motor is increased accordingly. The present disclosure does not limit the specific manner of increasing the rotation speed of the motor.

S306, determining whether the rotation speed of the motor reaches the target rotation speed. If yes, it is ended, that is, the motor is started successfully; if not, S304 is continued to be executed.

S307, determining whether the current in the motor is greater than a second preset current threshold, and whether the duration is greater than a second preset duration. If yes, S308 is executed.

S308, stopping the rotation of the motor. It is ended.

It should be noted that in some embodiments, the second preset current threshold is greater than the first preset current threshold, and the second preset duration is greater than the first preset duration. In order to increase the starting speed of the motor, the first preset current threshold is usually set to be slightly larger than the current for a stabilized operation of the motor; while in order to avoid overprotection, the second preset current threshold for determining whether to stop the rotation of the motor is usually set to be much larger than the current for a stabilized operation of the motor. If the current for the motor to smoothly operate is 0.8 amperes, the first preset current threshold can be 1 ampere, and the second preset current threshold can be 8 amperes. The first preset duration can be set to 1 second, and the second preset duration can be set to 8 seconds.

In the motor control method consistent with the present disclosure, the motor is controlled to start by combining speed classification and current feedback, which reduces the starting current of the motor, shortens the duration of the starting current, and improves the stability and speed of the motor startup.

The laser radar is often applied to a mobile object. For example, the laser radar is mounted at an unmanned vehicle or an unmanned aerial vehicle to obtain point cloud data in three-dimensional space, for three-dimensional reconstruction, navigation, etc. In this case, the laser radar will perform translational and/or rotational movement with movement of the object, which results in fluctuations in the rotation speed of the motor, and the fluctuations will cause point cloud gap of the laser radar to become larger or smaller, thereby a breathing effect is generated.

On the basis of any of the embodiments described above, in order to reduce the breathing effect, improve point cloud stability, and improve anti-interference ability of the laser radar, the method consistent with the present disclosure may further include: determining rotation speed fluctuation of each motor in a preset time period; controlling the rotation speed of slave motor according to the rotation speed of main motor. The main motor is a motor with the smallest rotation speed fluctuation, and the slave motors are other motors than the main motor.

The preset time period in some embodiments may be, for example, within 10 minutes before current time, or may be an entire time period from the start time of the motor to the current time, which can be set according to actual needs. The rotation speed fluctuation of the motor describes change of the rotation speed of the motor within the preset time period, and the rotation speed fluctuation of the motor can be measured with, for example, variance of the rotation speed of the motor within the preset time period.

The motor with small rotation speed fluctuation is more stable. Therefore, in some embodiments, the motor with the smallest rotation speed fluctuation is used as the main motor, and the rotation speeds of other motors are controlled according to the rotation speed of the main motor, which can reduce the breathing effect, improve the point cloud stability, and improve the anti-interference ability of the laser radar.

In some embodiments, an implementation manner for controlling the rotation speed of the slave motor according to the rotation speed of the main motor may be: controlling the rotation speed of the slave motor according to the rotation speed of the main motor and a preset relationship. The preset relationship is the relationship between the rotation speed of the main motor and the rotation speed of the slave motor.

In order to obtain different imaging effects, the motor rotation speeds in the laser radar can satisfy different relationships. In some embodiments, after the main motor with the smallest rotational speed fluctuation and the relationship between the rotational speed of the main motor and the rotation speed of the slave motor are determined, the rotation speed that the slave motor needs to reach at the current time can be determined according to the rotation speed of the main motor at the current time. In this way, the rotation speed of the slave motor is controlled, so that the rotation speed of the main motor and the rotation speed of the slave motor meet the preset relationship again, which improves the imaging effect and stability.

For example, when the rotation speed of the main motor and the rotation speed of the slave motor are in a linear relationship, the point cloud gap can have the same size, which improves stability of the point cloud.

The motor control method consistent with the present disclosure will be described in detail below with a specific example. In an example of a mechanical rotation laser radar (double prism version) that includes two motors, the rotation speeds of the two motors both fluctuate in actual applications, which will cause changes in the output point cloud gap, and thereby generate the breathing effect.

For example, the two motors can be labeled as M1 and M2, and the target rotation speeds of M1 and M2 are V1 and V2, respectively. V1 and V2 satisfy the following relationship:

$$V2=-\tfrac{2}{3}\times(V1-1)+198$$

In some embodiments, when the laser radar is started, M1 and M2 are started asynchronously, that is, M1 can be made to reach the target rotation speed V1 first, and then M2 can be started to reach the target rotation speed V2. The startup process of M1 and M2 can also use a graded startup mode, and for details, reference can be made to the embodiments described above, which will not be repeated herein. Since the working environment of the laser radar is not a stable environment, where vibration, rotation, etc. may occur, the rotation speeds of the two motors will be caused to fluctuate.

The rotation speed fluctuations of M1 and M2 in the preset time period are determined respectively, and the motor with small rotation speed fluctuation is used as the main motor and the motor with large rotation speed fluctuation is used as the slave motor. Then, the rotation speed of the slave motor that satisfies the rotation speed relationship described above is calculated according to the rotation speed of the main motor. The rotation speed of the slave motor is reset so that the rotation speeds of M1 and M2 always satisfy the rotation speed relationship described above during the operation of the laser radar.

It should be noted that the maximum point cloud gaps scanned by motor rotation speed combinations satisfying different relationships are also different. When the rotation speeds of M1 and M2 meet the linear relationship described above, the point cloud gap can have the same size, and the maximum point cloud gap can be kept within a small range.

The rotation speed of the other motor is determined according to the rotation speed of the motor with small fluctuation, which can reduce fluctuation of the point cloud gap size, reduce the breathing effect, improve the point cloud stability, and increase the stability of the laser radar in actual work.

On the basis of any of the embodiments described above, in order to further strengthen the protection of the motor and improve the stability of the laser radar, the method consistent with the present disclosure may further include: obtaining status parameters of the motor itself and status parameters of environmental factors; implementing corresponding protective measures according to the status parameters of the motor itself and the status parameters of the environmental factors.

The motor works in a certain environment, and the environmental factors will affect the operation status of the motor. For example, if operation temperature range of the motor is [−20° C., 60° C.], the motor may not work normally in an environment with a high temperature such as 100° C. or a low temperature such as −40° C. Therefore, if the motor is only protected according to its own working conditions, desired effect cannot be achieved, that is, the motor cannot be effectively protected.

For example, the protective measures in some embodiments may include reducing the rotation speed, stopping the rotation, giving an alarm, and so on.

The motor control method consistent with the present disclosure strengthens the protection of the motor by integrating the status parameters of the motor itself and the status parameters of the environmental factors and implementing the corresponding protective measures, which can effectively avoid abnormal damage to the motor, thereby improving the stability of the laser radar.

For example, the status parameters of the motor itself include at least one of the following: the current of the motor, the rotation speed of the motor, hardware status of the motor, communication status between the electronic speed controller that controls the motor and the corresponding main control, input voltage status of the motor, and resistance and coil status; the status parameters of the environmental factors include at least one of the following: power status of the laser radar, communication status of the laser radar, the ambient temperature, and laser operation status of the laser radar.

For example, different weights can be set for different status parameters according to degree of influence of the status parameters on motor operation.

In some embodiments, it may further include: determining the operation status of the motor according to the status parameters of the motor itself and the status parameters of the environmental factors. The operation status of the motor includes normal, alarm, and error.

The laser radar includes multiple motors, and the target rotation speeds of the multiple motors are usually different, so that degree of wear of each motor in the laser radar is different. It can be understood motor bearing with a higher rotation target speed is usually worn more severely, which will shorten service life of the laser radar. On the basis of any of the embodiments described above, in order to balance the wear of the motor, increase service life of the motor, and thereby increase the service life of the laser radar, the motor control method consistent with the present disclosure may further include: controlling at least two motors to exchange the target rotation speeds each time they are started. By exchanging the target rotation speed, the wear of the motor is balanced, and the service life of the motor can be improved.

The bearing plays an important role in the motor. Generally, different amounts of grease are injected into the bearing in order for the motor bearing to work better. The grease will form different covering oil films in the bearing, and different oil film distribution will generate different resistance to the rotation of the motor. If the motor continues to work in one direction, the oil film distribution in the motor bearing will change significantly with passage of time, and the resistance of the motor will gradually increase, resulting in reduction of the service life of the motor. For example, the motor can be controlled to change rotation direction every time it is started, so as to reduce the change in the oil film distribution, reduce the resistance of the oil film distribution to the motor, and improve the service life of the motor.

In some embodiments, an implementation manner to control at least two motors to exchange the target rotation speeds each time they are started may be: alternately setting at least two higher target rotation speeds as the target rotation speeds of the two motors; or alternately setting at least a higher target rotation speed and a lower rotation target speed as the target rotation speeds of the two motors.

For example, if the laser radar includes a first motor, a second motor, and a third motor, alternately setting at least two higher target rotation speeds as the target rotation speeds of the two motors may specifically include, each time the laser radar is started, alternately setting the highest target rotation speed and the second highest rotation target speed as the target rotation speeds of the first motor and the second motor, and always setting the lowest target rotation speed as the target rotation speed of the third motor.

In some embodiments, if the target rotation speeds that need to be alternately set are the first target rotation speed and the second target rotation speed, an implementation manner to control at least two motors to exchange the target rotation speeds each time they are started may be: performing counting each time the laser radar is started; obtaining count value the next time the laser radar is started; setting the first target rotation speed as the target rotation speed of the first motor and the second target rotation speed as the target rotation speed of the second motor if the count value is an odd number; setting the second target rotation speed as the target rotation speed of the first motor and the first target rotation speed as the target rotation speed of the second motor if the count value is an even number; automatically incrementing the count value.

The count value in some embodiments may be the number of start times of the laser radar. When the power is on for the first time, the count value is set to one, and the count value is increased by one after each power on.

For example, it can be controlled that the target rotation speed of each motor when it is restarted is set to be different from the target rotation speed at a previous start.

For example, the target rotation speeds of the multiple motors can be determined according to the number of the start times of the laser radar.

For example, the target rotation speeds can be exchanged according to operation time of the laser radar. For example, if the operation time of the laser radar is greater than or equal to the preset time, such as 74 hours, the target rotation speeds can be exchanged, so as to balance the wear of the motor, balance grease distribution, and improve the service life of the motor.

Figure 4:
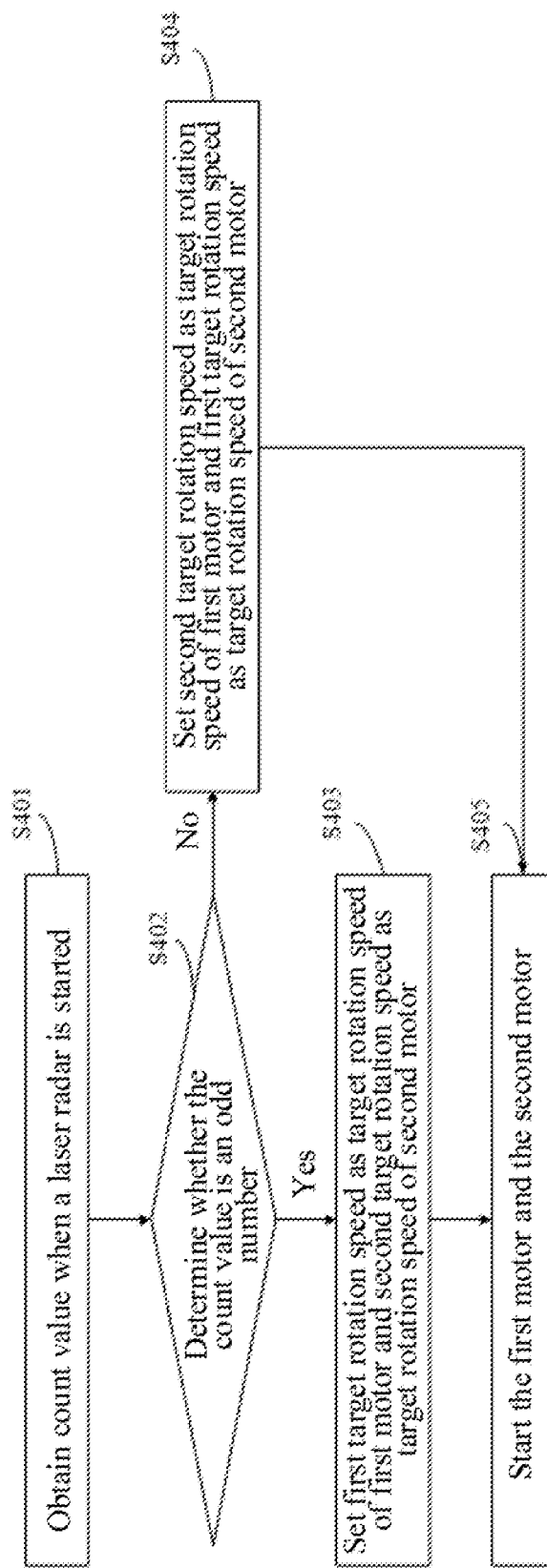
FIG. 4 is a flow chart of a motor control method according to another embodiment of the present disclosure.

FIG. 4 is a flow chart of the motor control method according to another embodiment of the present disclosure, in which the target rotation speeds of two motors (the first motor and the second motor) being exchanged is used as an example for description. As shown in FIG. 4, the motor control method consistent with the present disclosure, on the basis of any of the embodiments described above, further includes the following processes.

S401, obtaining the count value when the laser radar is started.

The count value in some embodiments may be the number of start times of the laser radar. Each time the laser radar is started, the count value is increased by one.

S402, determining whether the count value is an odd number. If yes, S403 is executed; if not, S404 is executed.

S403, setting the first target rotation speed as the target rotation speed of the first motor and the second target rotation speed as the target rotation speed of the second motor.

S404, setting the second target rotation speed as the target rotation speed of the first motor and the first target rotation speed as the target rotation speed of the second motor.

S405, starting the first motor and the second motor.

In the motor control method consistent with the present disclosure, the target rotation speeds of the first motor and the second motor are exchanged according to the count value, so that wear of the bearing of the first motor and the second motor can be balanced, and service life of the first motor and the second motor can be improved.

In order to obtain omnidirectional and multi-angle data, multiple laser radars are usually used in actual applications. For example, multiple laser radars are mounted around an unmanned vehicle to form a laser radar system, so as to achieve comprehensive obstacle avoidance and improve safety of the unmanned vehicle; multiple laser radars are mounted at an unmanned aerial vehicle, so as to obtain more data with a larger field of view and improve accuracy of 3D modeling, etc. If the multiple laser radars in the laser radar system are started at the same time, total starting current may be relatively large, which causes problem that electrical load of user system is relatively large at the time the laser radar system is started, and increases complexity of the user system.

Figure 5:
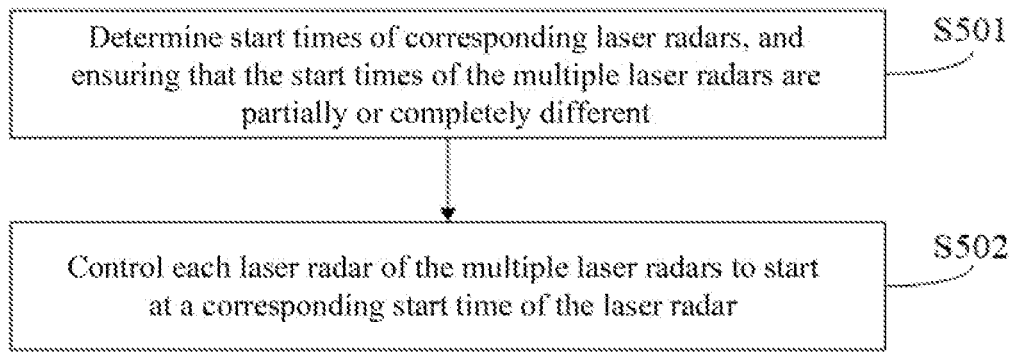
FIG. 5 is a flow chart of a laser radar control method according to an embodiment of the present disclosure.

The embodiments of the present disclosure also provide a laser radar control method, which is applied to a system including multiple laser radars. FIG. 5 is a flow chart of the laser radar control method according to an embodiment of the present disclosure. As shown in FIG. 5, the method consistent with the present disclosure includes the following processes.

S501, determining start times of corresponding laser radars, and ensuring that the start times of the multiple laser radars are partially or completely different.

For example, in some embodiments, for example, the multiple laser radars can be sorted, and time when last laser radar is started is used as start time of current laser radar, that is, the multiple laser radars are started in sequence. Startup sequence of each laser radar is strictly controlled by controlling startup sequence of each port. Only one port is powered on at a time, and the next port is powered on after the laser radar is started normally, and so on.

For example, in some embodiments, for example, the start times of the multiple laser radars can be determined according to start time of the laser radar system and a preset laser radar start interval time. For example, the preset laser radar start interval time can be determined according to average time required for the laser radar to start. For example, if the start time of the laser radar system is T, and the preset laser radar start time interval is $\Delta T$, then start time of first motor can be T, start time of second motor can be $T+\Delta T$, start time of third motor can be $T+2*\Delta T$, ..., and start time of Nth motor can be $T+(N-1)*\Delta T$, where N is number of laser radars included in the laser radar system.

For example, in order to reduce total starting current when the laser radar system is started, at least two laser radars have different start times.

For example, the start time of the corresponding laser radar can be determined according to identification information of the corresponding laser radar.

S502, controlling each laser radar of the multiple laser radars to start at a corresponding start time of the laser radar.

In some embodiments, after the start times of the multiple laser radars are determined, the various laser radars are controlled to start at the corresponding start times.

In the laser radar control method consistent with the present disclosure, the start times of the multiple laser radars that are partially or completely different are determined, and the various laser radars are controlled to start at the corresponding start times, so that the number of laser radars that are started at the same time when the laser radar system is started is reduced, and the total starting current is reduced, which thereby avoids abnormality of the laser radar system due to excessive starting current, and improves stability of the laser radar system. Further, for a user system equipped with multiple laser radars, using of the laser radar control method consistent with the present disclosure can reduce the complexity of the user system.

In some embodiments, an implementation manner of determining the start time of the corresponding laser radar according to the identification information of the corresponding laser radar may be: calculating time interval between the start time of each laser radar and system start time according to the identification information of each laser radar, and obtaining the start time of each laser radar according to the time interval and the system start time.

For example, in order to increase start speed of the laser radar system, the time interval in some embodiments is less than or equal to a preset time interval, and the preset time interval may be determined according to the number of the laser radars included in the laser radar system. For example, the time interval can be less than or equal to 4 seconds, that is, within 4 seconds of starting the laser radar system, all the laser radars are started.

For example, calculating the time interval between the start time of the corresponding laser radar and the system start time according to the identification information of the corresponding laser radar, and obtaining the start time of the corresponding laser radar according to the time interval and the system start time may specifically include: obtaining the start time of each laser radar according to the following formula:

$$T1 = T0 + ((ID+K1)\% \ K2)*K3$$

T0 represents the system start time, T1 represents the start time of the laser radar, ID represents the identification information of the laser radar, % represents remainder operation, K1, K2, and K3 are constants, K1=10, K2=10, and K3=400. The identification information of the laser radar in some embodiments may use a unique identifier of the laser radar, for example, it may be serial number of laser radar chip, product code of the laser radar, etc. It should be noted that values of the constants K1, K2, and K3 in some embodiments are not unique, and can be set, for example, by comprehensively considering the start speed of the laser radar system and the stability of the laser radar system.

In some embodiments, the time interval between the start time of the laser radar and the start time of the laser radar system is determined according to the unique identification information of the laser radar, and asynchronous startup of different laser radars in the same laser radar system is realized through this time interval, which avoids superposition of peak currents of the multiple laser radars, reduces the total starting current of the laser radar system, and solves the problem of large current peaks at the time the laser radar system is started.

It can be understood that each laser radar in the laser radar system may include at least one motor, and the method consistent with the present disclosure may further include: controlling each motor to complete a start within a start time interval between adjacent starts of the laser radars.

Figure 6:
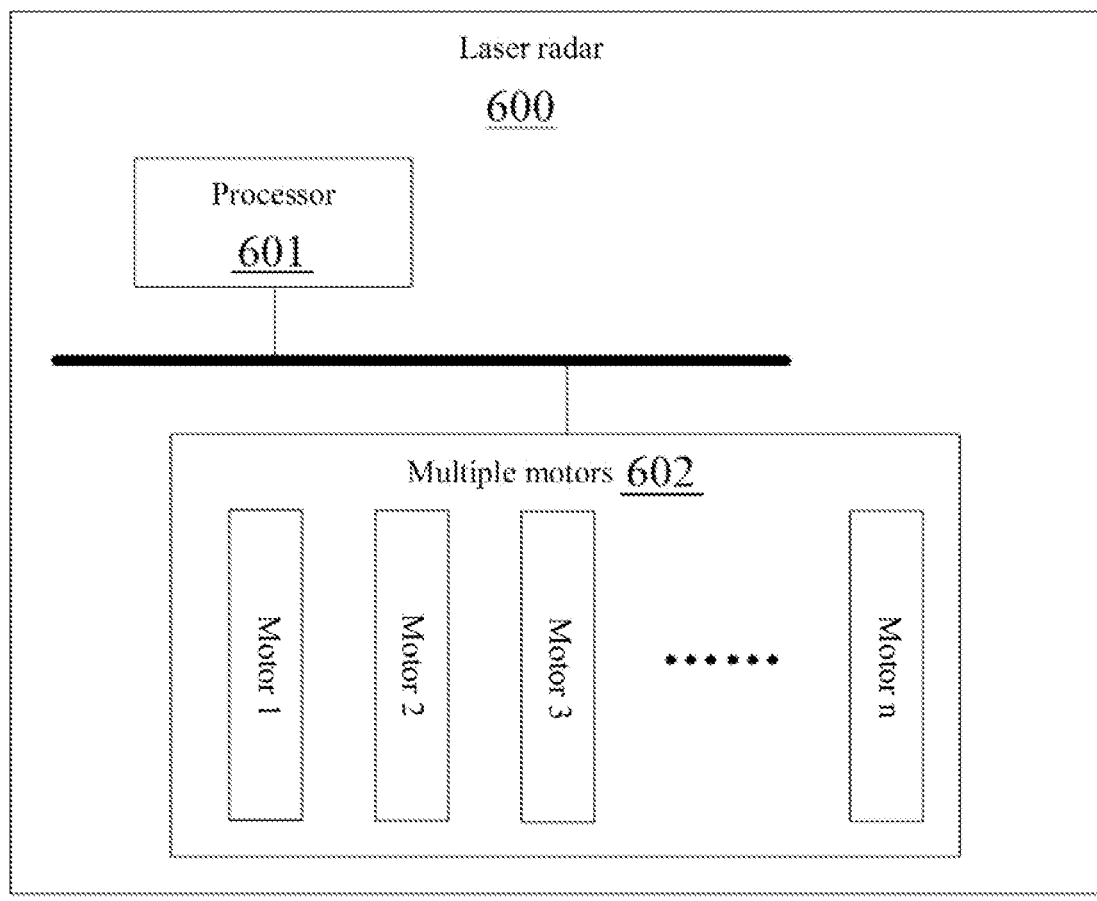
FIG. 6 is a schematic structural diagram of a laser radar according to an embodiment of the present disclosure.

The embodiments of the present disclosure also provide a laser radar. FIG. 6 is a schematic structural diagram of the laser radar according to an embodiment of the present disclosure. As shown in FIG. 6, a laser radar 600 provided in the present disclosure includes a processor 601 and multiple motors 602. The processor 601 and the multiple motors 602 are connected in communication via a bus. The multiple motors 602 in some embodiments include n motors such as motor 1, motor 2, motor 3, . . . , and motor n, where n is an integer greater than or equal to 2. The processor 602 described above may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, etc. The general-purpose processor may be a microprocessor or the processor may also be any conventional processor.

The processor 601 is configured to: determine start times of the multiple motors, the start times of the multiple motors being partially or completely different; and control each motor of the multiple motors to start at a corresponding start time of the motor.

For example, the processor 601 is configured to determine the start times of the multiple motors, which specifically includes: determining the start times of the multiple motors according to identification information of the multiple motors.

For example, the processor 601 is configured to control each motor of the multiple motors to start at a corresponding start time of the motor, which specifically includes: obtaining target rotation speed of the motor; determining graded rotation speed according to the target rotation speed, the graded rotation speed being less than the target rotation speed; and controlling the motor to start at the graded rotation speed at the start time of the motor.

For example, the processor 601 is configured to determine the graded rotation speed according to the target rotation speed, which specifically includes: determining the graded rotation speed according to the target rotation speed and corresponding relationship between the rotation speed and the current; or, determining the graded rotation speed according to the target rotation speed and the ambient temperature; or, determining the graded rotation speed according to the target rotation speed, the ambient temperature, and the corresponding relationship between the rotation speed and the current.

For example, the processor 601 is further configured to: if the rotation speed of the motor reaches the graded rotation speed and the current in the motor is less than a preset current threshold, increase the rotation speed of the motor until the rotation speed of the motor reaches the target rotation speed.

For example, the processor 601 is further configured to: when the current in the motor is less than the preset current threshold and lasts for a preset duration, increase the rotation speed of the motor.

For example, the preset current threshold is greater than or equal to the current for a stabilized operation of the motor.

For example, the processor 601 is further configured to: determine rotation speed fluctuation of each motor in a preset time period; and control the rotation speed of slave motor according to the rotation speed of main motor, the main motor being the motor with the smallest rotation speed fluctuation, and the slave motors being other motors than the main motor.

For example, the processor 601 is configured to control the rotation speed of the slave motor according to the rotation speed of the main motor, which specifically includes: controlling the rotation speed of the slave motor according to the rotation speed of the main motor and a preset relation, the preset relation being the relationship between the rotation speed of the main motor and the rotation speed of the slave motor.

For example, the rotation speed of the main motor and the rotation speed of the slave motor are in a linear relationship.

For example, the processor 601 is further configured to: obtain status parameters of the motor itself and status parameters of the environmental factors; and implement corresponding protective measures according to the status parameters of the motor itself and the status parameters of the environmental factors.

For example, the status parameters of the motor itself include at least one of the following: the current of the motor, the rotation speed of the motor, hardware status of the motor, communication status between the electronic speed controller that controls the motor and the corresponding main control, input voltage status of the motor, and resistance and coil status; the status parameters of the environmental factors include at least one of the following: power status of the laser radar, communication status of the laser radar, the ambient temperature, and laser operation status of the laser radar.

For example, the processor 601 is further configured to: determine operation status of the motor according to the status parameters of the motor itself and the status parameters of the environmental factors, the operation status of the motor including normal, alarm, and error.

For example, the processor 601 is further configured to: determine the target rotation speeds of the multiple motors according to number of start times of the laser radar.

For example, the processor 601 is further configured to: control at least two motors to exchange the target rotation speeds each time they are started.

For example, the processor 601 is configured to control at least two motors to exchange the target rotation speeds each time they are started, which specifically includes: alternately setting at least two higher target rotation speeds as the target rotation speeds of the two motors; or alternately setting at least a higher target rotation speed and a lower rotation target speed as the target rotation speeds of the two motors.

For example, the laser radar includes a first motor, a second motor, and a third motor, and the processor 601 is configured to alternately set at least two higher target rotation speeds as the target rotation speeds of the two motors, which specifically includes: each time the laser radar is started, alternately setting the highest target rotation speed and the second highest rotation target speed as the target rotation speeds of the first motor and the second motor, and always setting the lowest target rotation speed as the target rotation speed of the third motor.

For example, the target rotation speeds that need to be alternately set are the first target rotation speed and the second target rotation speed, and the processor 601 is configured to control at least two motors to exchange the target rotation speeds each time they are started, which specifically includes: performing counting each time the laser radar is started; obtaining count value the next time the laser radar is started; setting the first target rotation speed as the target rotation speed of the first motor and the second target rotation speed as the target rotation speed of the second motor if the count value is an odd number; setting the second target rotation speed as the target rotation speed of the first motor and the first target rotation speed as the target rotation speed of the second motor if the count value is an even number; automatically incrementing the count value.

For example, the processor 601 is further configured to: control the target rotation speed of each motor at a restart to be set different from a target rotation speed at a previous start.

Figure 7:
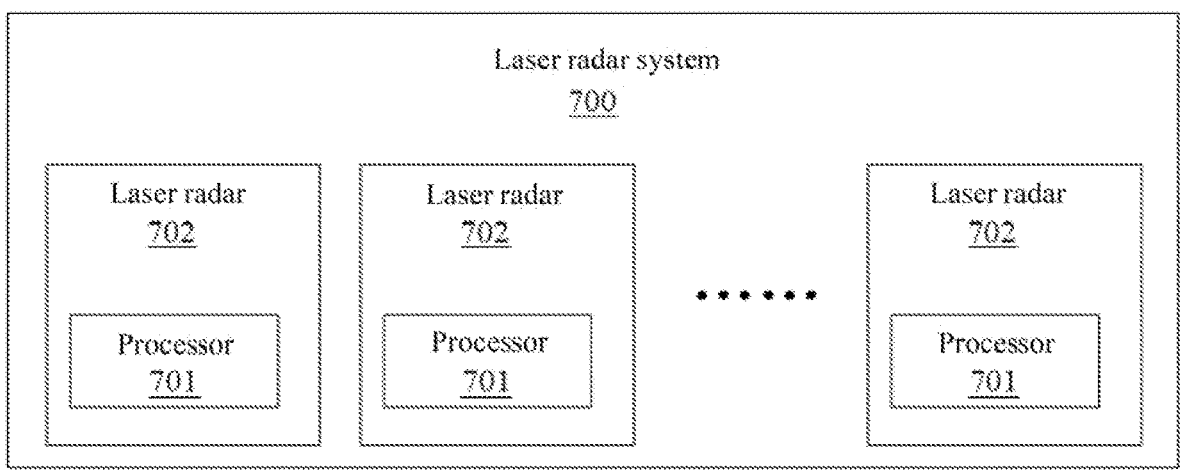
FIG. 7 is a schematic structural diagram of a laser radar system according to an embodiment of the present disclosure.

The embodiments of the present disclosure also provide a laser radar system. FIG. 7 is a schematic structural diagram of the laser radar system according to an embodiment of the present disclosure. As shown in FIG. 7, a laser radar system 700 provided in the present disclosure includes multiple laser radars 702, and each laser radar 702 includes a processor 701. The processor 701 described above may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, etc. The general-purpose processor may be a microprocessor or the processor may also be any conventional processor.

The processor 701 is configured to: determine start times of the corresponding laser radars, and ensure that the start times of the multiple laser radars are partially or completely different; and control each laser radar of the multiple laser radars to start at a corresponding start time of the laser radar.

Specifically, the corresponding laser radar is the laser radar where the processor 701 is located.

For example, the processor 701 is configured to determine the start times of the corresponding laser radars, which specifically includes: determining the start time of the corresponding laser radar according to identification information of the corresponding laser radar.

For example, the processor 701 is configured to determine the start times of the corresponding laser radars according to the identification information of the corresponding laser radars, which specifically includes: calculating time interval between the start time of the corresponding laser radar and the system start time according to the identification information of the corresponding laser radar, and obtaining the start time of the corresponding laser radar according to the time interval and the system start time.

For example, the time interval is less than or equal to 4 seconds.

For example, the processor 701 is configured to calculate the time interval between the start time of the corresponding laser radar and the system start time according to the identification information of the corresponding laser radar, and obtain the start time of the corresponding laser radar according to the time interval and the system start time, which specifically includes: obtaining the start time of each laser radar according to the following formula:

$$T1 = T0 + ((ID + K1) \% K2) * K3$$

T0 represents the system start time, T1 represents the start time of the laser radar, ID represents the identification information of the laser radar, % represents remainder operation, K1, K2, and K3 are constants, K1=10, K2=10, and K3=400.

For example, each laser radar includes at least one motor, and the processor 701 is further configured to: control each motor to complete a start within a start time interval between adjacent starts of the laser radars.

Figure 8:
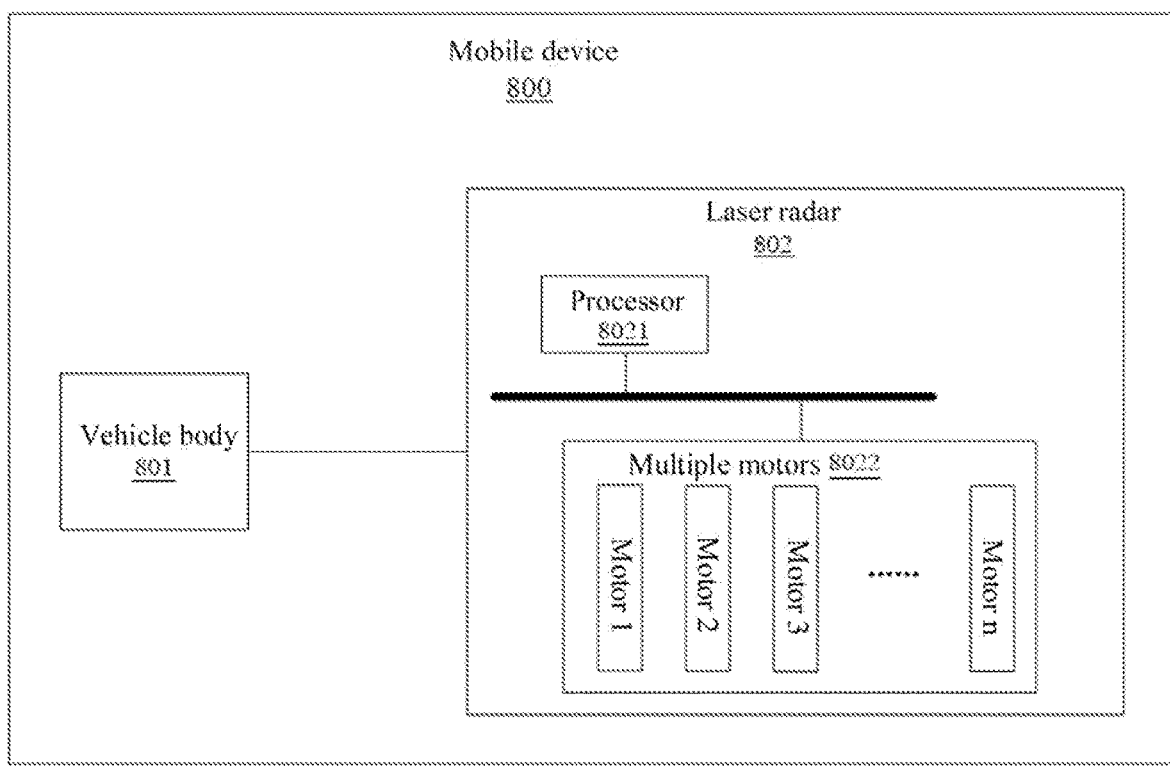
FIG. 8 is a schematic structural diagram of a movable device according to an embodiment of the present disclosure.

The embodiments of the present disclosure also provide a movable device. FIG. 8 is a schematic structural diagram of the movable device according to an embodiment of the present disclosure. As shown in FIG. 8, a movable device 800 provided in the present disclosure includes: a vehicle body 801 and a laser radar 802 mounted at the vehicle body 801. The laser radar 802 includes a processor 8021 and multiple motors 8022.

The processor 8021 is configured to: determine start times of the multiple motors, the start times of the multiple motors being partially or completely different; and control each motor of the multiple motors to start at a corresponding start time of the motor.

For example, the movable device may be an unmanned vehicle, or an unmanned aerial vehicle, or an unmanned ship, etc.

For example, the processor 8021 is configured to determine the start times of the multiple motors, which specifically includes: determining the start times of the multiple motors according to identification information of the multiple motors.

For example, the processor 8021 is configured to control each motor of the multiple motors to start at a corresponding start time of the motor, which specifically includes: obtaining target rotation speed of the motor; determining graded rotation speed according to the target rotation speed, the graded rotation speed being less than the target rotation speed; and controlling the motor to start at the graded rotation speed at the start time of the motor.

For example, the processor 8021 is configured to determine the graded rotation speed according to the target rotation speed, which specifically includes: determining the graded rotation speed according to the target rotation speed and corresponding relationship between the rotation speed and the current; or, determining the graded rotation speed according to the target rotation speed and the ambient temperature; or, determining the graded rotation speed according to the target rotation speed, the ambient temperature, and the corresponding relationship between the rotation speed and the current.

For example, the processor 8021 is further configured to: if the rotation speed of the motor reaches the graded rotation speed and the current in the motor is less than a preset current threshold, increase the rotation speed of the motor until the rotation speed of the motor reaches the target rotation speed.

For example, the processor 8021 is further configured to: when the current in the motor is less than the preset current threshold and lasts for a preset duration, increase the rotation speed of the motor.

For example, the preset current threshold is greater than or equal to the current for a stabilized operation of the motor.

For example, the processor 8021 is further configured to: determine rotation speed fluctuation of each motor in a preset time period; and control the rotation speed of slave motor according to the rotation speed of main motor, the main motor being the motor with the smallest rotation speed fluctuation, and the slave motors being other motors than the main motor.

For example, the processor 8021 is configured to control the rotation speed of the slave motor according to the rotation speed of the main motor, which specifically includes: controlling the rotation speed of the slave motor according to the rotation speed of the main motor and a preset relation, the preset relation being the relationship between the rotation speed of the main motor and the rotation speed of the slave motor.

For example, the rotation speed of the main motor and the rotation speed of the slave motor are in a linear relationship.

For example, the processor 8021 is further configured to: obtain status parameters of the motor itself and status parameters of the environmental factors; and implement corresponding protective measures according to the status parameters of the motor itself and the status parameters of the environmental factors.

For example, the status parameters of the motor itself include at least one of the following: the current of the motor, the rotation speed of the motor, hardware status of the motor, communication status between the electronic speed controller that controls the motor and the corresponding main control, input voltage status of the motor, and resistance and coil status; the status parameters of the environmental factors include at least one of the following: power status of the laser radar, communication status of the laser radar, the ambient temperature, and laser operation status of the laser radar.

For example, the processor 8021 is further configured to: determine operation status of the motor according to the status parameters of the motor itself and the status parameters of the environmental factors, the operation status of the motor including normal, alarm, and error.

For example, the processor 8021 is further configured to: determine the target rotation speeds of the multiple motors according to number of start times of the laser radar.

For example, the processor 8021 is further configured to: control at least two motors to exchange the target rotation speeds each time they are started.

For example, the processor 8021 is configured to control at least two motors to exchange the target rotation speeds each time they are started, which specifically includes: alternately setting at least two higher target rotation speeds as the target rotation speeds of the two motors; or alternately setting at least a higher target rotation speed and a lower rotation target speed as the target rotation speeds of the two motors.

For example, the laser radar includes a first motor, a second motor, and a third motor, and the processor 8021 is configured to alternately set at least two higher target rotation speeds as the target rotation speeds of the two motors, which specifically includes: each time the laser radar is started, alternately setting the highest target rotation speed and the second highest rotation target speed as the target rotation speeds of the first motor and the second motor, and always setting the lowest target rotation speed as the target rotation speed of the third motor.

For example, the target rotation speeds that need to be alternately set are the first target rotation speed and the second target rotation speed, and the processor 8021 is configured to control at least two motors to exchange the target rotation speeds each time they are started, which specifically includes: performing counting each time the laser radar is started; obtaining count value the next time the laser radar is started; setting the first target rotation speed as the target rotation speed of the first motor and the second target rotation speed as the target rotation speed of the second motor if the count value is an odd number; setting the second target rotation speed as the target rotation speed of the first motor and the first target rotation speed as the target rotation speed of the second motor if the count value is an even number; automatically incrementing the count value.

For example, the processor 8021 is further configured to: control the target rotation speed of each motor at a restart to be set different from a target rotation speed at a previous start.

Figure 9:
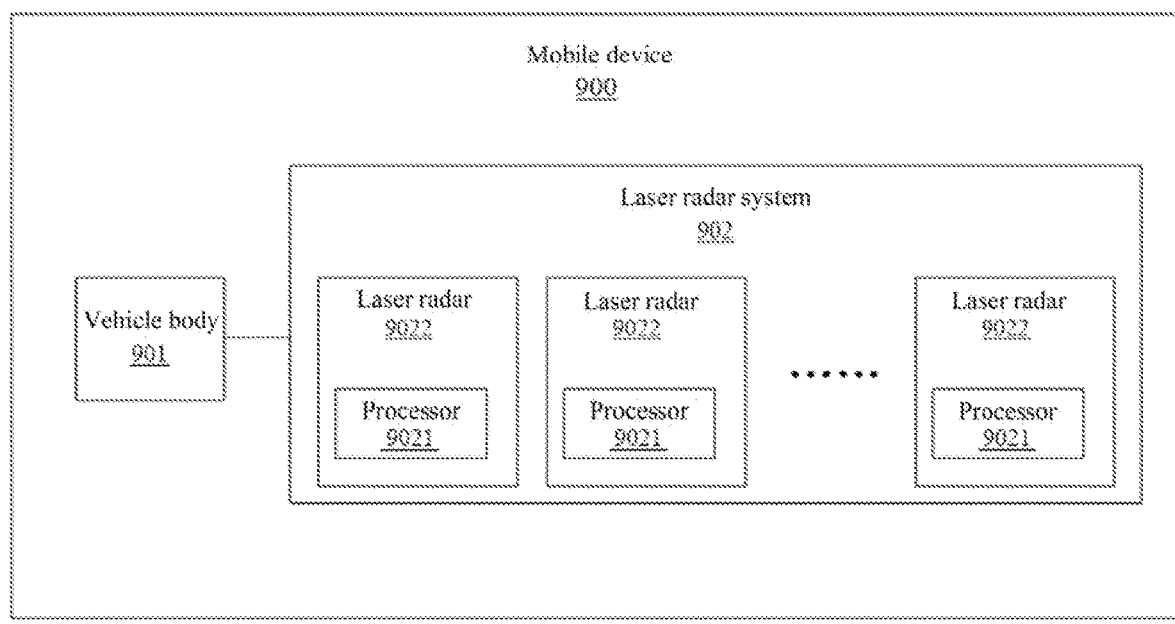
FIG. 9 is a schematic structural diagram of a movable device according to another embodiment of the present disclosure.

The embodiments of the present disclosure also provide a movable device. FIG. 9 is a schematic structural diagram of the movable device according to another embodiment of the present disclosure. As shown in FIG. 9, a movable device 900 provided in the present disclosure includes: a vehicle body 901 and a laser radar system 902 mounted at the vehicle body 901. The laser radar system 902 includes multiple laser radars 9022, and each laser radar 9022 includes a processor 9021.

The processor 9021 is configured to: determine start times of the corresponding laser radars, and ensure that the start times of the multiple laser radars are partially or completely different; and control each laser radar of the multiple laser radars to start at a corresponding start time of the laser radar.

Specifically, the corresponding laser radar is the laser radar where the processor 9021 is located.

For example, the processor 9021 is configured to determine the start times of the corresponding laser radars, which specifically includes: determining the start time of the corresponding laser radar according to identification information of the corresponding laser radar.

For example, the processor 9021 is configured to determine the start times of the corresponding laser radars according to the identification information of the corresponding laser radars, which specifically includes: calculating time interval between the start time of the corresponding laser radar and the system start time according to the identification information of the corresponding laser radar, and obtaining the start time of the corresponding laser radar according to the time interval and the system start time.

For example, the time interval is less than or equal to 4 seconds.

For example, the processor 9021 is configured to calculate the time interval between the start time of the corresponding laser radar and the system start time according to the identification information of the corresponding laser radar, and obtain the start time of the corresponding laser radar according to the time interval and the system start time, which specifically includes: obtaining the start time of each laser radar according to the following formula:

$$T1=T0+((ID+K1)\% \ K2)*K3$$

T0 represents the system start time, T1 represents the start time of the laser radar, ID represents the identification information of the laser radar, % represents remainder operation, K1, K2, and K3 are constants, K1=10, K2=10, and K3=400.

For example, each laser radar includes at least one motor, and the processor 9021 is further configured to: control each motor to complete a start within a start time interval between adjacent starts of the laser radars.

The embodiments of the present disclosure also provide a motor control device (such as a chip, an integrated circuit, etc.), which includes: a memory and a processor. The memory is configured to store codes for executing the motor control method. The processor is configured to call the codes stored in the memory to execute the motor control method consistent with the present disclosure such as any motor control method described above. The motor control device provided in the present disclosure can be applied to the laser radar.

One of ordinary skill in the art can understand that all or part of the processes in the method of the embodiments described above can be implemented by a program instructing relevant hardware, and the program can be stored in a computer readable storage medium. When the program is executed, the processes in the method of the embodiments are executed. The storage medium includes a read-only memory (ROM), a random access memory (RAM), a magnetic disk, an optical disk, or another medium that can store program codes.

Finally, it should be noted that the embodiments described above are only used to illustrate the technical solutions of the present disclosure rather than limiting them. Although the present disclosure has been described in detail with reference to all the described embodiments, those of ordinary skill in the art should understand that the technical solutions in all the described embodiments can still be modified, or some or all of the technical features can be equivalently replaced. The modifications or replacements do not cause the essence of the corresponding technical solutions to depart from the scope of the technical solutions in the embodiments of the present disclosure.

What is claimed is:

1. A motor control method, applied to a laser radar including multiple motors, comprising:
   determining start times of the multiple motors, the start times of the multiple motors being partially or completely different, and the start time of one motor of the multiple motors being a time when a rotation speed of the one motor starts to increase from 0 RPM to an operating speed of the one motor; and
   controlling each motor of the multiple motors to start at a corresponding start time of the motor.

2. The method of claim 1, wherein determining the start times of the multiple motors includes determining the start times of the multiple motors according to identification information of the multiple motors.

3. The method of claim 1, wherein controlling each motor of the multiple motors to start at the corresponding start time of the motor includes:
   obtaining a target rotation speed of the motor;
   determining a graded rotation speed according to the target rotation speed, the graded rotation speed being less than the target rotation speed; and
   controlling the motor to start at the start time of the motor to reach the graded rotation speed.

4. The method of claim 3, further comprising,
   in response to the rotation speed of the motor reaching the graded rotation speed and current in the motor being less than a preset current threshold, increasing the rotation speed of the motor until the rotation speed of the motor reaches the target rotation speed.

5. The method of claim 1, further comprising:
   determining rotation speed fluctuation of each motor in a preset time period;
   after the rotation speed fluctuation of each motor is determined, determining one motor of the multiple motors with a smallest rotation speed fluctuation as a main motor, and determining another motor of the multiple motors as a slave motor; and
   controlling the rotation speed of the slave motor according to the rotation speed of the main motor.

6. The method of claim 5, wherein controlling the rotation speed of the slave motor according to the rotation speed of the main motor includes controlling the rotation speed of the slave motor according to the rotation speed of the main motor and a preset relation, the preset relation being a relationship between the rotation speed of the main motor and the rotation speed of the slave motor.

7. The method of claim 6, wherein the rotation speed of the main motor and the rotation speed of the slave motor are in a linear relationship.

8. The method of claim 1, further comprising:
   obtaining status parameters of the motor and status parameters of environmental factors; and
   implementing corresponding protective measures according to the status parameters of the motor and the status parameters of the environmental factors.

9. The method of claim 8, wherein:
   the status parameters of the motor include at least one of current of the motor, a hardware status of the motor, a communication status between an electronic speed controller that controls the motor and a corresponding main control, an input voltage status of the motor, or a resistance and coil status; and
   the status parameters of the environmental factors include at least one of a power status of the laser radar, or an ambient temperature.

10. A laser radar comprising:
    multiple motors; and
    a processor configured to:
        determine start times of the multiple motors, the start times of the multiple motors being partially or completely different, and the start time of one of the multiple motors being a time when a rotation speed of the one motor starts to increase from 0 RPM to an operating speed of the one motor; and
        control each motor of the multiple motors to start at a corresponding start time of the motor.

11. The laser radar of claim 10, wherein the processor being configured to determine the start times of the multiple motors specifically includes determining the start times of the multiple motors according to identification information of the multiple motors.

12. The laser radar of claim 10, wherein the processor being configured to control each motor of the multiple motors to start at the corresponding start time of the motor specifically includes:
    obtaining a target rotation speed of the motor;
    determining a graded rotation speed according to the target rotation speed, the graded rotation speed being less than the target rotation speed; and
    controlling the motor to start at the start time of the motor to reach the graded rotation speed.

13. The laser radar of claim 12, wherein the processor being configured to determine the graded rotation speed according to the target rotation speed specifically includes:
    determining the graded rotation speed according to the target rotation speed and a corresponding relationship between the rotation speed and current; or
    determining the graded rotation speed according to the target rotation speed and an ambient temperature; or
    determining the graded rotation speed according to the target rotation speed, the ambient temperature, and the corresponding relationship between the rotation speed and the current.

14. The laser radar of claim 12, wherein the processor is further configured to, in response to the rotation speed of the motor reaching the graded rotation speed and current in the motor being less than a preset current threshold, increase the rotation speed of the motor until the rotation speed of the motor reaches the target rotation speed.

15. The laser radar of claim 10, wherein the processor is further configured to:
   determine rotation speed fluctuation of each motor in a preset time period;
   after the rotation speed fluctuation of each motor is determined, determine one motor of the multiple motors with a smallest rotation speed fluctuation as a main motor, and determine another motor of the multiple motors as a slave motor; and
   control the rotation speed of the slave motor according to the rotation speed of the main motor.

16. The laser radar of claim 15, wherein the processor being configured to control the rotation speed of the slave motor according to the rotation speed of the main motor specifically includes controlling the rotation speed of the slave motor according to the rotation speed of the main motor and a preset relation, the preset relation being a relationship between the rotation speed of the main motor and the rotation speed of the slave motor.

17. The laser radar of claim 16, wherein the rotation speed of the main motor and the rotation speed of the slave motor are in a linear relationship.

18. The laser radar of claim 10, wherein the processor is further configured to:
   obtain status parameters of the motor and status parameters of environmental factors; and
   implement corresponding protective measures according to the status parameters of the motor and the status parameters of the environmental factors.

19. The laser radar of claim 18, wherein:
   the status parameters of the motor include at least one of current of the motor, a hardware status of the motor, a communication status between an electronic speed controller that controls the motor and a corresponding main control, an input voltage status of the motor, or a resistance and coil status; and
   the status parameters of the environmental factors include at least one of a power status of the laser radar, or an ambient temperature, and laser operation status of the laser radar.

20. A motor control method comprising:
   determining start times of multiple motors of a laser radar, the start times of the multiple motors being partially or completely different; and
   controlling the multiple motors to start at corresponding start times of the multiple motors, including, for each one motor of the multiple motors:
      obtaining a target rotation speed of the one motor; and
      determining a graded rotation speed less than the target rotation speed according to:
         the target rotation speed and an ambient temperature; or
         the target rotation speed, the ambient temperature, and a corresponding relationship between rotation speed and current; and
   controlling the one motor to start at the graded rotation speed at the start time of the one motor.

* * * * *